United States Patent
Tschudin

(10) Patent No.: US 6,985,438 B1
(45) Date of Patent: Jan. 10, 2006

(54) METHOD AND APPARATUS FOR PROCESSING AND FORWARDING DATA PACKETS

(76) Inventor: Christian Tschudin, Delsbergerallee 61, CH-4053 Basel (CH)

( * ) Notice: Subject to any disclaimer, the term of this patent is extended or adjusted under 35 U.S.C. 154(b) by 0 days.

(21) Appl. No.: 09/526,117

(22) Filed: Mar. 15, 2000

(30) Foreign Application Priority Data

Sep. 20, 1999 (CH) ................................ 99 810833

(51) Int. Cl.
*H04L 12/28* (2006.01)
(52) U.S. Cl. ........................ 370/230; 370/389; 370/392
(58) Field of Classification Search ........ 370/230–231, 370/395.3, 395.32, 395.7, 389, 392
See application file for complete search history.

(56) References Cited

U.S. PATENT DOCUMENTS

| | | | |
|---|---|---|---|
| 4,679,189 A | | 7/1987 | Olson et al. |
| 6,034,958 A | * | 3/2000 | Wicklund ............... 370/395.32 |
| 6,069,895 A | * | 5/2000 | Ayandeh ...................... 370/399 |
| 6,157,641 A | * | 12/2000 | Wilford ....................... 370/389 |
| 6,434,144 B1 | * | 8/2002 | Romanov .................... 370/392 |
| 6,526,055 B1 | * | 2/2003 | Perlman et al. ............. 370/392 |
| 6,567,404 B1 | * | 5/2003 | Wilford ....................... 370/389 |
| 6,570,876 B1 | * | 5/2003 | Aimoto ....................... 370/389 |

OTHER PUBLICATIONS

Banches et al., "Multicasting Multimedia Streams with Active Networks", IEEE, 1998.*
Smith et al., "Activating Neetworks: A Progress Report", IEEE, 1999.*
Report "Multicasting Streams with Active Networks", 23rd Annual Conference on Local Computer Networks, LCN-98, Oct. 11-14, 1998, p.p. 150-159.
Smith J.M. et al., "Active Networks: Progress Report" Computer, U.S., IEEE Computer Society, No. 4, Apr. 4, 1999, p.p. 32-41.
European Search Report.

* cited by examiner

*Primary Examiner*—Seema S. Rao
*Assistant Examiner*—Robert C. Scheibel, Jr.
(74) *Attorney, Agent, or Firm*—Abelman, Frayne & Schwab

(57) ABSTRACT

The method and the apparatus for processing and forwarding data packets (pkt) in a computer network comprise at least one route table that contains entries each having an input index field (s-in), an operation code or a program (op) for the execution of an operation and an output selector field (s-out). The data packets (pkt) to be processed are each assigned a selector (sel) serving as indexing datum, the data packet (pkt) and the selector (sel) together constituting a token. The selector (sel) of a packet is matched with the input index field (s-in) of the entries of the at least one route table and the operation (op) contained in the matched route table entry or route table entries is/are executed on the matched token. This processing step can be repeated if the operation (op) results in one or more output token/tokens. Since according to the invention, programs to be executed on data packets (pkt) are stored in the route table, data packets (pkt) are directly processed in the fast data path, while at the same time the router can be dynamically reprogrammed.

17 Claims, 2 Drawing Sheets

METHOD AND APPARATUS FOR PROCESSING AND FORWARDING DATA PACKETS

BACKGROUND OF THE INVENTION

1. Field of the Invention

The present invention relates to a method for processing and forwarding data packets using at least one route table.

2. Description of the Prior Art

The current standard architecture for a data packet router in a computer network comprises a packet classification module, a routing module and a packet scheduler module. As a first step, an incoming data packet is assigned a class by the classification module and possibly also predefined processing is applied to it, such as checking the source address, changing or adding some header fields, decrementing the time-to-live (TTL) field, dropping it if the TTL value reaches 0 etc. As a second step, the routing module uses the resulting class and packet header to evaluate the packet's further route. For this purpose it contains a forwarding information base which usually has the form of a route table and merely serves as "signpost" for the data packets to be transmitted. Next, additional processing may apply to the packet, before the packet is put, as a third main step, in at least one packet queue that is controlled by the packet scheduler. Streamlined variants of the above process exist, where a packet is directly copied from the incoming network interface card that may have its own forwarding information base to an outgoing interface card.

This standard procedure, the so-called "fast data path" of a router, is illustrated in FIG. 1. Whereas the route table, i.e. the "signpost" for data packets, can be dynamically updated, the procedure itself is a static pipeline operating on incoming data packets. The set of instructions applied to a packet is rather limited and predetermined by the packet's type (class). Reconfiguration of a data router, e.g. said updating of the route table, is achieved by special purpose "signaling" protocols. Data packets that belong to such a protocol are removed from the fast data path and are passed to external processing modules capable of handling the signaling protocol.

Active networks add programmability to a router while still adhering to the same architecture (see FIG. 2): The router hosts one or more execution entities $EE_i$ to $EE_n$ which are responsible for interpreting program instructions contained in "active packets", namely data packets that themselves contain the program to be applied to them, or other signaling information.

At a high level of abstraction, the control flow for a single packet inside a traditional and possibly active router in this standard approach can be depicted as shown in FIG. 3. A program store drives the Central Processing Unit (CPU) and the CPU reads from the route table for making routing decisions. Accessing the route table is necessary for almost every data packet that enters the system. Actual routers may have multiple CPUs, program and data stores.

If a whole classical routing system is regarded from the data flow architecture point of view, it represents an example of the data flow model: Data items are processed by stationary instructions. This is in contrast to the "von Neumann" computing model which is the dominant model for traditional computing. The "von Neumann" model is characterized by one or more control flows in motion that operate on data residing in explicitly addressed memory places.

SUMMARY OF THE INVENTION

It is the object of the present invention to provide a method that enables to process data packets in a computer network in the fast data path while simultaneously allowing to dynamically reprogram the router and to provide at the same time a new method for the execution of programs that makes parallel processing possible either in a data flow or in a "von Neumann" architecture.

According to the invention, this object is achieved by means of a method for processing and forwarding data packets comprising the steps of:

providing at least one route table comprising entries containing an input index field and at least one operation code or a program for the execution of an operation, assigning a selector serving as indexing datum to each data packet, the data packet and its selector being parts of a token, matching of the selector of a packet matched with the input index field of the entries of said at least one route table, execution on the matched token of the at least one operation contained in the at least one matched route table entry.

According to an other aspect of the invention, an apparatus is provided for the processing of data packets in the fast data path while it can be dynamically reprogrammed at the same time, namely an apparatus comprising the following items:

at least one route table comprising entries containing an input index field and at least one of operation code and of a program for the execution of an operation, means for assigning a selector serving as indexing datum to each data packet, the data packet and its selector being parts of a token, means for matching the selector of a packet with the input index field of the entries of said at least one route table, means for executing on the matched token the at least one operation contained in the at least one matched route table entry.

According to the invention, at least one routing table is provided that comprises entries containing operation code or a program for the execution of an operation. In this way, the programmable packet processing method of the present invention replaces the routing module of classical packet routers and merges it with the execution entity modules as previously introduced. FIG. 4 shows, on the same level of abstraction as FIG. 3, this merging and the resulting control path for data packets. The method and apparatus according to the invention make it possible that standard operating and routing of data packets and dynamic reprogramming of the router take place in the same fast data path. Thus, reprogramming as well as routing is faster and handled more uniformly than by the methods and devices known so far.

Further, an incoming data packet preferably contains itself the information on what operation is executed on it by having assigned a selector, i.e. an indexing datum to be matched with a route table input index field, that matches a route table index field that belongs to a certain operation to be executed on the packet. Therefore, any packet most naturally plays an active role instead of a passive role of the data packets in standard routing methods upon which predefined operations are executed. A selector may even refer to an operation that transfers another operation stored within the packet to the routing table and thus activates it. In this way, the concept of "active packets" is naturally embedded by the invention in the classical routing concept.

A further advantage of the method according to the present invention is that it allows the routing module to particularly quickly access information about the processing to be applied to a packet and its path since all the required information is contained in one selector field which may be a predefined bit field in the header of the packet. Conventional routing includes a relatively time consuming search for relevant information within a packet header.

A still further advantage of the present invention is that it is completely compatible to prior art routing and that the forwarding behavior of a classical routing module can be provided.

The method according to the invention, in addition to being a method for routing of packets containing simple data, also enables the execution of arbitrary programs. From the data flow architecture point of view, the execution model according to the present invention is an alternate computing model to the "von Neumann" model and is a hybrid with elements of a data flow—as well as of a "von Neumann"-model approach. A structural similarity to a data flow machine is given by the fact that instructions are stored inside the route table while data items (i.e. selector+packet tokens) flow through these operations. However, the method according to the invention can also host a "von Neumann" style of program by having one selector+packet token represent one flow of control. Each control flow then picks one instruction after the other, it therefore operates on the token's data as well as on the route table itself.

The method according to the invention easily and naturally enables parallel computing. It just has to be allowed for the possibility that different tokens are matched to different route table entries at the same time and the corresponding operations are executed simultaneously. Parallel computing is even better be taken advantage of if the matching of tokens with route table entries is carried out in a non-deterministic instead of in a deterministic way.

Finally, the method according to the present invention allows to implement distributed processing on different processing entities in a rather straightforward manner.

BRIEF DESCRIPTION OF THE INVENTION

The preferred embodiments of the invention are described with reference to the accompanying drawings in which.

DETAILED DESCRIPTION OF A PREFERRED EMBODIMENT

Figure 5:
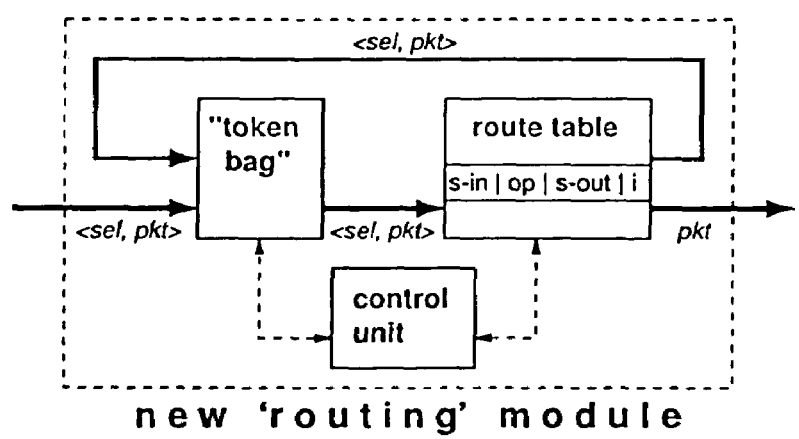
FIG. 5 shows a routing module in accordance with the invention.

In the following, a detailed description of an embodiment of the present invention, namely a routing module, is given with reference to FIG. 5, which schematically depicts a block diagram of this embodiment of the method according to the invention.

The routing module to be described in the following is based on four elements:
(a) A plurality of tokens of the form <sel,pkt>, where sel is a selector (or "tag") serving as indexing datum and pkt is a data packet,
(b) a multi-set ("token bag") for storing tokens,
(c) a route table consisting of entries, each containing the following fields:

| $sel_{in}$ | c | $sel_{out}$ | i |
|---|---|---|---| where $sel_{in}$ is an in-selector value serving as input index field, c an operation code, $sel_{out}$ an out-selector value serving as output index field and i an additional state. i may contain information, such as an additional selector value, queuing information or other additional processing information, to be used depending on the status of the packet to be processed.
(d) a control unit (CU).

This new routing module operates as follows:
1. A <sel,pkt> token arrives from the packet classification module and is put into the multi-set.
2. The control unit picks and removes a token from the multi-set.
3. The token's selector value sel is used to locate all entries in the route table that have a matching $sel_{in}$ field. Tokens for which no matching in-selector values can be found are discarded. Alternatively, they are processed by a default processing routine.
4. For each matching entry, the corresponding operation c is performed:
   If the operation is a FORW (forward) operation, the token's packet data is put into a queue of the subsequent packet scheduler module. Information about which queue to use is either stored in the entry's state field i, is computed from the packet's data, or is otherwise provided.
   If the operation is a HALT operation, the token is destroyed and no output token is generated.
   For any other operation, one or more new tokens are generated that contain the possibly modified packet data of the input token. The new tokens' sel values are either copied from the $sel_{out}$ field of the route table entry, or otherwise computed.
5. New tokens, if any were generated, are put in the multi-set.
6. Processing continues with step 1 or 2.

Figure 1:
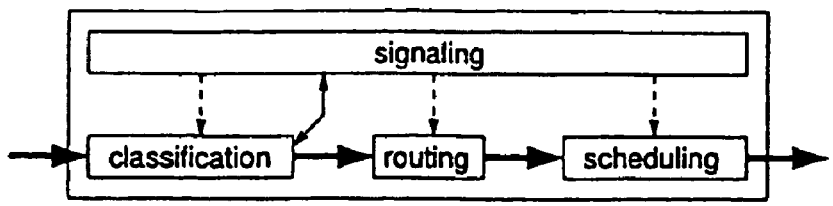
FIGS. 1–3 show various prior art routing systems.
Figure 2:
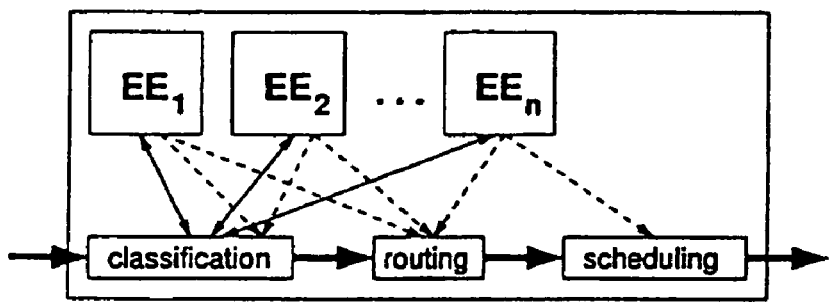
Figure 3:
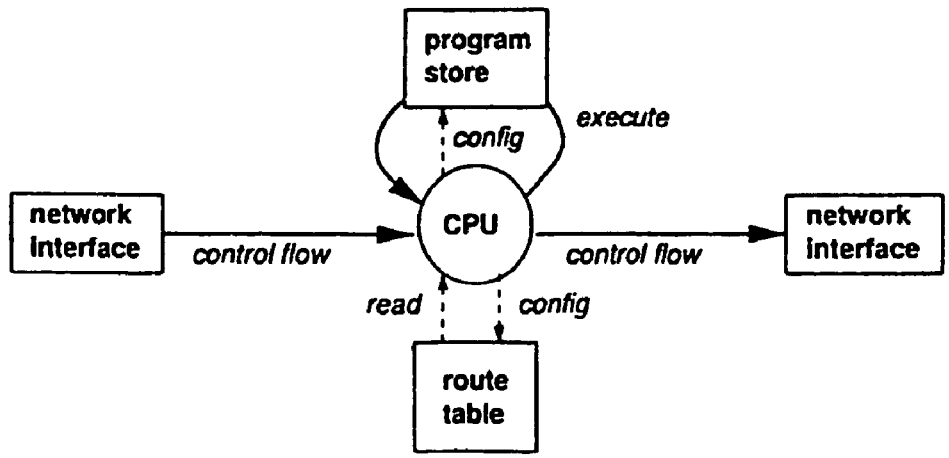
Figure 4:
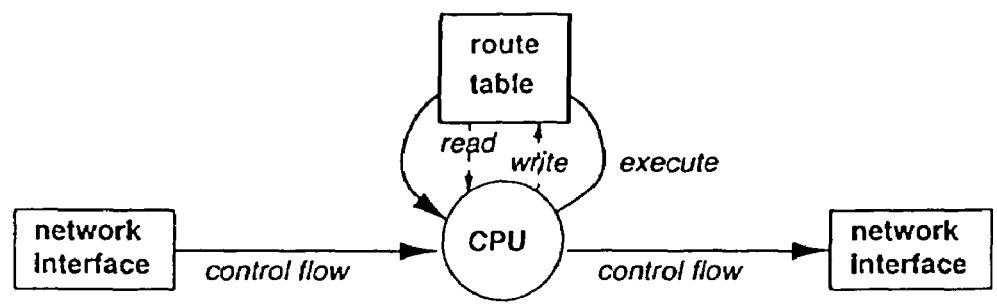
FIG. 4 illustrates a control path for data packets in accordance with the invention.

The prior art's routing module's role is to map data packets, based on classifications and/or packet header fields, to the packet queues of the packet scheduler module. This forwarding behavior of the prior art's routing module can also be provided by the above specified new routing module. To do that, the following steps have to be carried out:

Unicast Forwarding:
(a) The packet classifier (c.f. FIGS. 1 and 2) is configured such that it provides a selector for each data packet type. Unclassifiable packets are assigned a default selector. The packets are subsequently put in the multi-set ("token bag") depicted in FIG. 5.
(b) The routing table is configured such that each potential selector value has exactly one entry.
(c) A special operation code c is defined and an associated procedure is implemented in the route table and an entry is defined whose $sel_{in}$ value corresponds to the default selector. The procedure thus treats the packets that were classified in the default category and which therefore need special matching rules (e.g. longest prefix for IP addresses: Such an operation most likely makes use of the entry's additional state i). The said operation either outputs a new token whose selector value indexes another entry in the route table that contains the FORW operation and puts this token in the token bag, or it directly performs the FORW.

Multicast Forwarding:

The same approach as above is used, except that multiple entries exist in the route table which have the same $sel_{in}$ value. Two cases are possible:
(1) The classifier assigns such an ambiguous selector value. Steps 3 and 4 will automatically take care of multiplying the incoming data packet,
(2) The classifier assigns an unambiguous selector. However, one or more of the subsequent operations c create a new token with a selector value for which multiple entries exist.

Applied in the above way for routing, the routing module works as a data flow computing device. A structural similarity to a data flow machine is given by the fact that instructions are stored inside the route table while tokens "flow" through these operations. Also, selectors resemble the tags of data flow machines that identify the state and position of a token. However, we note that the matching and execution rules are different from classical data flow architectures (data-driven vs. demand-driven) as tokens can be discarded if there is no matching entry in the route table. Also, selectors are explicitly handled by the programs themselves instead of being an internal aspect of data flow execution.

In addition to being a further development of a classical routing module, the new routing module also enables the execution of arbitrary programs by the virtue of the repeated execution of instructions according to the steps 3 and 4. This can be done as follows:

Each thread of execution is mapped to one <sel,pkt> token.

The program instructions are stored as operations in the route table.

A token's selector value points to the next instruction to process. It plays the role of the "program counter" of other computing devices. Instructions which generate an output token are therefore required to choose the new selector value such that it points to the next instruction to be processed. This may be done by choosing the selector contained in the $sel_{out}$ field of route table entries or by computing the new sel value.

Execution of a program flow ends when a selector value is matched with a route table entry containing an operation that does not generate an output token or when the resulting token has no matching entry.

For executing programs for general purposes, the set of instructions has to contain minimal support for branching as well as memory access, allowing to conditionally divert program flows and to implement procedure calls:

An instruction that is able to output tokens with different output selector values suffices to implement branching. The resulting selector value may depend on the token's packet data and/or any other state in the router, including the route table, the packet classifier and packet scheduler, and/or may even be assigned randomly.

Instructions to add, read, change and remove complete entries in the route table provide memory access. It is interesting to notice that such instructions to add, read and remove entries from the route table turn the present invention's routing module into a Turing complete computing device.

Together with instructions to store and retrieve selector values, e.g. inside a token's data packet, inside the route table, or in other places, the branching instructions enable procedure calls.

If the method according to the invention is used in the way described above, it essentially is a "von Neumann" computing device. As each control flow picks one instruction after the other, it operates on the token's data as well as on the route table itself. This operation mode will be discussed further below more concretely by way of examples 3 and 4.

Using the above described tools, the method according to the invention also most naturally leads to parallel computing. One has only to allow for the possibility that different tokens are matched with different route table entries simultaneously and to start with more than one token representing a program flow. For the case of the parallel execution of program flows, basic synchronization primitives must be provided:

By switching off the eligibility of tokens to be picked by the CU, i.e. by temporarily removing tokens from the multi-set ("token bag"), execution flows can be suspended.

Special instructions are provided to make suspended tokens re-eligible for execution, either explicitly (barriers, queues) and/or by environmental changes (e.g. a timeout or a condition to be fulfilled).

For some applications based on parallel computing it may be attractive not to predetermine the selection of route table entries that match a given token. In this case, the selection of these route table entries will be carried out by the machine instead of the programmer and will therefore be non-deterministic instead of deterministic. As a consequence, the processor or the processors can optimize its/their work-load and thus enable even faster processing.

By means of the above specified tools, the programmable routing module outlined above enables a superset of classic router functionality as well as arbitrary programming to be implemented. It, however, is by no means the only embodiment of the invention and can be extended or modified in many respects.

Instead of one route table as described above, multistage route tables or a plurality of route tables can be provided. In such a case it is for instance possible to map every execution entity ($EE_i$) of a prior art routing module onto one route table and in this way to be able to make use of the wealth of tools developed for the prior art routers. A selector of a token will then not only select the route table entry but also the route table of which the entry is part. In this way, a packet can jump between the different route tables, depending on its selector, the $sel_{out}$ values contained in the route table and/or other information. Therefore, operations contained in different route tables, and for instance one operation out of every route table, can be executed on a single packet in its path. Alternatively, if, for instance, k route tables are present, the selector of a token could also be divided into k parts, each of which refers to an other route table.

One route table entry can also contain more than one operation. In such a case, preferably all route table entries will have the same number of operations. Further, also additional fields or attributes such as fields for the priority, counters, access control lists, certificates, . . . may be provided for.

Operation code or a program contained in a route table entry can also exhibit a reference to an externally installed subroutine or any other software and/or hardware based device serving as an extension of said operation code or program. Further, there may be route table entries that, depending on the selector values and possibly also on the packet data of incoming tokens, can implement changes to these extensions as well as to other modules such as a packet classifier, a control unit or a scheduler of a router.

A route table is a table in the conceptual sense and does not have to be a table in the literal sense. Therefore, it can have a data structure that is different from a table structure and, for instance, have the structure of an array of records or a linked list of memory zones. It can also be in a compressed form and comprise auxiliary data structures, for instance hash tables, or other lookup mechanisms to access the route table entries.

The tokens do not need to have a <sel,pkt> form. The selector information can also be contained explicitly or implicitly in the data packet and therefore has to be extracted or calculated from its contents. For many system architectures it will also be advisable to give the tokens additional attributes, such as suspended flag, processing queue, priority, credentials, access rights, certificates etc. In such additional attributes it can for instance be laid down that a packet is not allowed to make changes to the route table, that it is to be processed only after a certain condition is fulfilled, etc.

A variety of possible further embodiments of the invention concerns the data flow architecture. As explained above, the present invention relates to an execution model (FIG. 5) which is a hybrid with elements drawn from both, the "von Neumann" and from the data flow side.

This hybrid approach is well in-line with the less strict view on data flow architectures that has emerged in recent years (multithreaded computers). However, in the present method for data packet processing and forwarding, tokens can flow in the network. Thus, data flow items are not confined anymore to one central processing unit but are transportable over the network. The selector concept, together with the "programmable route table" and the execution loop model of FIG. 5, are the key enabler for this approach. The method according to the invention is therefore also highly suited to be implemented using multiple processing elements.

An apparatus according to the invention, namely a router, comprises the following elements:
  A device for receiving, processing and forwarding data, for instance a computer equipped with appropriate interfaces.
  An implementation of the method for data packet processing and forwarding according to the invention on said device, for instance a program stored on the computer or a microprocessor the architecture of which is such that it supports the data flow and control flow architecture of the method according to the invention particularly the data and control flow as schematically depicted in FIG. 5.

While previously the method and apparatus according to the invention were discussed in a rather abstract way, in the following a few examples for router table stored programs are given in order to make the invention concrete. The examples refer to the routing module comprising one route table having entries with four fields described above as embodiment of the invention.

EXAMPLE 1

Forwarding Branch

Using a PASCAL like notation, we aim at implementing the following packet handling program with the new routing module:
  PROC example_one(s: selector);
  CONST t: selector;
  BEGIN
    IF exists a route table entry with in-selector s THEN
      drop front packet header;
      forward via selector s
    ELSE
      forward via selector t
    FI
  END.

where the incoming packet has the following layout
  (head) [sel s|payload](tail)

and is classified for selector p on entry (thus, initially the token has the form <p,[s|payload]>).

This packet format adheres to the convention that parameters for instructions and procedures are stored at the packet's head. Similarly, this convention will be extended for the subsequent examples and the packet's tail will be used for a stack of return addresses (selectors).

The following instructions are needed to implement the first example program:
  NOP token(s: selector)
  token( ) is a pseudo operation that changes a token's selector value to the new value s before the token is put back into the token bag.
  The token( ) pseudo operation can be realized by the stand-alone instruction NOP (no-operation) whose $sel_{out}$ field has the value s:

| $sel_{in}$ | NOP | s | — |

JCEX jump_on_existence(a, b, c: selector)
  A conditional jump is made i.e., the output token receives a new selector value depending on the content of the route table:
    IF exists a route table entry with in-selector a THEN
      token (b)
    ELSE
      token (c)
    FI
  By convention it is assumed that parameter a is stored as the first header field inside the token's packet data as described above, while b and c are stored in the route table entry of the JCEX instruction instance.
  JH jump_to_header( )
  The token's new selector value is taken from the token's packet header, and the packet length is trimmed accordingly:
    VAR s: selector;
    s :=pop front of packet header
    token (s);

Using these three instructions, the forwarding branch procedure example-one( ) is implemented by the following route table content:

| $sel_{in}$ | OP | $sel_{out}$ | addtl. state | |
|---|---|---|---|---|
| p | JCEX | $t_1$ | $t_2$ | jmp to $t_1$ if hdr field (s) is known, else jmp to $t_2$ |
| $t_1$ | JH | — | — | pop hdr field and jump there (s) |
| $t_2$ | FORW | — | queue id | forward |
| s | FORW | — | queue id | forward |

Packets arrive classified for selector p. Thus, program execution starts with the first line of the table above. Note that the last line of the table above may or may not be present: The program will take care of correctly forwarding packets in both cases.

EXAMPLE 2

Recursive Procedure Call

In this example, a procedure will recursively be called that pops a header field until it encounters a header field with a specific value m. The program should thus work like the following

```
PROC example_two( );
  CONST m: selector;
  VAR s: selector;
BEGIN
  s :=pop packet header;
  IF NOT (s=m) THEN
    example_two ( )
  FI
END.
``` where the incoming packet has the following layout:
[$s_1$|$s_2$| ... |m|payload].

In order for the "return addresses" $r_i$ of procedure calls to be stored, they we will be appended to the data packet's tail:
[ ... |payload|$r_1$| ... |$r_n$]

The following additional instructions are needed for this example program:

JC jump_conditional (a, b: selector)
Conditionally jumps to selector a, i.e. the output token has a as its selector value, if the packet's first header field is not the null selector. Otherwise, execution continues at selector b (the output token obtains the selector value b).

JT jump_to_tail( )
Pops the outermost tail field of the data packet which becomes the output token's new selector value. The data packet's length is reduced accordingly.

POPH pop_header( )
Removes (drops) the first header field of the data packet

PUSHT push_tail(selector s)
Extends the data packet by the selector value s.

XOR xor(s: selector)
Performs a bit-wise XOR operation on the packet's first header field with s.

The following route table implements the recursive procedure example-two( ). As in the previous example, the token arrives selected for a selector value p, i.e. it initially has a sel value of p:

| $sel_{in}$ | OP | $sel_{out}$ | addtl. state | |
|---|---|---|---|---|
| p | PUSHT | $t_0$ | $t_6$ | save return addr $t_6$, jmp to proc at $t_0$ |
| $t_0$ | XOR | $t_1$ | m | start of proc: compare with m |
| $t_1$ | JC | $t_2$ | $t_4$ | jump to $t_4$ if equal (i.e. first header field = 0) |
| $t_2$ | POPH | $t_3$ | — | drop first header field |
| $t_3$ | PUSHT | $t_0$ | $t_5$ | save return address $t_5$, jmp to proc at $t_0$ |
| $t_4$ | POPH | $t_5$ | — | drop first header field |
| $t_5$ | JT | — | — | return from proc call |
| $t_6$ | FORW | — | queue id | forward trimmed packet, end of example program |

EXAMPLE 3

Stream Programming (Program Downloading)

This example shows a method to store a program inside a remote route table by sending appropriate data packets. This is useful for having "path finder packets" to configure a remote node by downloading a program that will treat a data stream's subsequent packets.

An external representation of route table entries is required that is self-delimiting. The following instruction depends on such a format:

ADDOP add_operation(r: route_table_entry)
The route_table_entry ($S_{in}$,op,$S_{out}$ and additional state) is popped from the packet's header and placed in the route table. The length of the data packet is accordingly decreased.

HALT halt( )
Discards the current token (i.e., ends the current program flow).

The following route table program scans a data packet for route table entries and installs them. For this, the data packet must consist of a sequence of route table entries $re_i$, followed by a zero selector field:
[$re_1$| ... | $re_n$|0-sel|payload]

Furthermore, the following program, the "packet handler program", is permanently stored inside the route table. The selector DP is a well-known selector to be used for invoking the downloading program:

| $sel_{in}$ | OP | $sel_{out}$ | addtl. state | |
|---|---|---|---|---|
| DP | JC | $t_0$ | $t_1$ | start of download proc: 0-sel? |
| $t_0$ | ADDOP | DP | — | install new table entry, loop |
| $t_1$ | HALT | — | — | end of proc |

This download program can be extended by user provided enhancements, allowing to "bootstrap" fancier download procedures. If for example a "confirmed download" service is required, one can use the program above to blindly download the modified download program which, instead of executing the halt( ) instruction, returns a confirmation packet.

EXAMPLE 4

Active Packets

Instead of having a pre-stored program being applied to data packets, this example shows how to implement in-band programming where the program to be applied to a packet is carried inside the packet itself. Various names are used synonymously for such packets: capsules, messengers or active packets.

One approach consists in extending the stream programming example above in two ways. The first modification relates to the packet format, where we presume that a second (start-) selector value follows the O-sel of the previous example:

[$re_1$| . . . |$re_n$|0-sel|start-sel|payload]

The second modification concerns the packet handler program:

| $sel_{in}$ | OP | $sel_{out}$ | addtl. | state |
|---|---|---|---|---|
| AP | JC | $t_0$ | $t_1$ | active packet proc: 0-sel? |
| $t_0$ | ADDOP | AP | — | install new table entry, loop |
| $t_1$ | POPH | $t_2$ | — | drop null selector |
| $t_2$ | JH | — | — | jump to start selector |

The disadvantage of this approach is that the in-band program is stripped from the packet, preventing self-routing packets to keep their code base as they travel in an active network. The second approach below fixes this problem by introducing the following concurrency related instructions:

QIN queue_in(s: selector)
The current token is "put into a token queue", the queue is identified by the selector s at the packet's first header position, this header field is removed and the packet length is adjusted accordingly.
Only the token which is at the head of the token queue is eligible for execution, other tokens in the queue have to wait until they advance to the head position. Tokens can be in at most one token queue at any time. Switching to another queue implicitly removes the token from its former queue it was in. Terminating a token (e.g. using the HALT operation) also frees the head position of the token's current queue.

FORK fork(a, b: selector)
This operation outputs two tokens. Both have the same packet data but different selector values (a or b). There is no parent/child relation between the forked tokens, although the token with the selector a inherits all input token attributes, e.g. position in a token queue, while the attributes of the other token are reset to some default value.

DUPH dup_head(s: selector)
Duplicates the selector s at the packet's head. This results in a larger data packet that starts with two identical header fields.

DUPT dup_tail ( )
Duplicates the selector at the packet's tail. This results in a larger data packet that ends with two identical tail fields.

Active packets need to have the internal format

[id-sel|$re_1$| . . . |$re_n$|0-sel|payload|start-sel]

for being processed by the following extended active packet loader program:

| $sel_{in}$ | OP | $sel_{out}$ | addtl. | state |
|---|---|---|---|---|
| EAP | DUPH | $t_0$ | — | extd active pkt loader: dup id sel |
| $t_0$ | QIN | $t_1$ | — | put thread in the 'id' queue |
| $t_1$ | FORK | $t_2$ | $u_0$ | fork |
| $t_2$ | JC | $t_3$ | $t_4$ | install the pkts program: 0-sel? |
| $t_3$ | ADDOP | $t_2$ | — | add new route table entry, loop |
| $t_4$ | HALT | — | — | end (and quit the current queue) |
| $u_0$ | DUPH | $u_1$ | — | the forked token, dup id selector |

-continued

| $sel_{in}$ | OP | $sel_{out}$ | addtl. | state |
|---|---|---|---|---|
| $u_1$ | QIN | $u_2$ | — | put thread in the 'id' queue, block |
| $u_2$ | DUPT | $u_3$ | — | dup start selector at the tail |
| $u_3$ | JT | — | — | jump to start selector |

Note that the forked token synchronizes with the main token when the later has finished installing the program. Synchronization is achieved via the queue that is identified by the id selector. Preferably, each active packet is assigned its own id value in order to avoid synchronization conflicts. Despite the fork( ) operation, the main token remains at the head of this queue and continues to do so during the install loop. The forked token inserts itself into the same queue, but will occupy the second position, thus block. When the main token halts and thus quits the token queue, the forked token advances to the head position and starts executing the freshly installed program. At this point, the token's packet data is identical to the data that the original token had when it entered the new routing module.

EXAMPLE 5

Beyond a Single Router—Distributed Programming and a Router Model with Trivial Classification Module In this example it will be shown that the concept of instructions at the route table level that explicitly point to the next instruction can be seamlessly extended beyond the scope of a single router or route table to a net of processing entities. It suffices that a packet is transmitted together with its token selector value e.g. by choosing the following wire format that contains an initial selector field:

[init-sel|pkt]

The init selector and the remaining packet payload are the two elements required to form a token: Classification of an incoming data packet is reduced to reading in the init-sel field. Of course, the network architecture that is induced by such a router model requires that packet classification is performed upstream, or ultimately at the edge of such a network.

With the wire format presented above, selectors can be turned into pointers to remote instructions: They allow to arbitrarily redirect the execution flow to one or more neighbor routers or route tables and to implement distributed algorithms. For redirection, one has to replace a route table entry by one or more FORW operations that send a packet to a remote node where processing will continue. The $S_{out}$ field of the table entry containing the FORW operation can then be used for specifying the selector for the remote target instruction.

What is claimed is:
1. A method for processing and forwarding data packets comprising the steps of:
providing at least one route table comprising entries, at least one of which contains an input index field, an output index field, and at least one operation code or a program for the execution of an operation,
assigning a selector serving as indexing datum to each data packet, the data packet and its selector being parts of a token, matching of the selector of a packet matched with the input index field of the entries of said at least one route table, executing on the matched token of the at least one operation contained in the at least one matched route table entry, and maintaining at least one multi-set of tokens, that every matched token is removed from said at least one multi-set, that the packet of such a matched token depending on the semantics of the operation referenced by the matched route table entry, is forwarded or destroyed or at least one new token is generated and again added to one of said at least one multi-set, the selector of said at least one new token being copied from the output index field of the matched route table entry or being otherwise computed.

2. Apparatus for processing and forwarding data packets wherein the following items are provided:

at least one route table comprising entries, at least one of which contains an input index field, an output index field, and at least one operation code or a program for the execution of an operation, means for assigning a selector serving as indexing datum to each data packet, the data packet and its selector being parts of a token, means for matching the selector of a packet with the input index field of the entries of said at least one route table, means for executing on the matched token the at least one operation contained in the at least one matched route table entry and means for maintaining at least one multi-set of tokens, that every matched token is removed from said at least one multi-set, that the packet of such a matched token depending on the semantics of the operation referenced by the matched route table entry, is forwarded or destroyed or at least one new token is generated and again added to one of said at least one multi-set, the selector of said at least one new token being copied from the output index field of the matched route table entry or being otherwise computed.

3. The apparatus of claim 2, comprising at least one microprocessor the architecture of which implements at least one of said items.

4. A method for processing and forwarding data packets comprising the steps of:

providing at least one route table comprising entries, at least one of which contains an input index field, an output index field, and at least one operation code for an action other than forwarding data packets or a program for the execution of a respective operation, assigning a selector serving as indexing datum to each data packet, the data packet and its selector being parts of a token, matching of the selector of a packet matched with the input index field of the entries of said at least one route table, executing on the matched token of the at least one operation contained in the at least one matched rout table entry, maintaining at least one multi-set of tokes such that every matched token is removed from said at least one multi-set and that the packet of such a matched token, depending on the semantics of the operation referenced by the matched route table entry, is forwarded or destroyed or at least one new token is generated and again added to one of said at least one multi-sets, the selector of said at least one new token being copied from the output index field of the matched route table entry or being otherwise computed.

5. The method of claim 1, wherein tokens can be temporarily removed from said at least one multi-set and reinserted later on.

6. The method of claim 1, wherein a control unit is provided which selects the tokens from the multi-set to be matched with entries of the route table.

7. The method of claim 1, wherein the route table comprises at least one entry containing one of an operation code or a program that can take care of at least one of entering parts of the contents of a data packet containing operation code into a route table entry and of removing or changing existing route table entries.

8. The method of claim 1, wherein said at least one of an operation code or a program contained in at least one route table entry comprises a reference to an externally installed subroutine and and any other software or hardware based device serving as an extension.

9. The method of claim 8, wherein the route table comprises at least one entry containing at least one of an operation code or a program that can take care of altering an extension or other modules based on information contained in a data packet.

10. The method of claim 7, wherein at least one token containing an operation code is assigned a program flow and at least one of the operation code and its selector and other data stored in said at least one token is formed such that the program flow is executed based on information contained in the token and in the route table.

11. The method of claim 1, wherein tokens for which no match with entries of the route table is possible, are deleted.

12. The method of claim 1, wherein at least one default processing routine is provided and wherein tokens for which no match with an input index field of an entry of the at least one route table is possible are processed by one of said at least one default processing routines.

13. The method of claim 1, wherein the at least one route table is implemented as an array or set of records having the structure of regular or consecutive memory zones, linked lists of memory zones, trees of memory zones or combinations thereof.

14. The method of claim 1, wherein one or more auxiliary hash tables or indirection pointers are provided to access the entries of said at least one route table.

15. The method of claims claim 1, wherein at least one route table entry contains more than one operation.

16. The method of claims claim 1, wherein the selection of route table entries that match a given token is non-deterministic.

17. The method of claims claim 1, wherein a token's indexing datum is one of being embedded in and of being deductible from the token's data packet.

* * * * *